United States Patent [19]
DeWolf et al.

[11] Patent Number: 5,279,458
[45] Date of Patent: Jan. 18, 1994

[54] NETWORK MANAGEMENT CONTROL

[75] Inventors: Thomas L. DeWolf, Liverpool; Thomas R. Phillips; Ronald W. Bench, both of Cicero, all of N.Y.

[73] Assignee: Carrier Corporation, Syracuse, N.Y.

[21] Appl. No.: 743,959

[22] Filed: Aug. 12, 1991

[51] Int. Cl.[5] .................. G05D 23/00; F24F 3/00
[52] U.S. Cl. .................... 236/47; 165/22; 236/51
[58] Field of Search .............. 236/51, 46, 47; 165/22

[56] References Cited

U.S. PATENT DOCUMENTS

| | | | |
|---|---|---|---|
| 4,174,064 | 11/1979 | Pratt, Jr. | 236/51 X |
| 4,287,939 | 9/1981 | Pohl et al. | 236/51 X |
| 4,819,714 | 4/1989 | Otsuka et al. | 236/51 X |
| 4,829,779 | 5/1989 | Munson et al. | 236/51 X |
| 5,104,037 | 4/1992 | Karg et al. | 236/46 R |

OTHER PUBLICATIONS

Savas; Computer Control of Industrial Processes 1965 pp. 12-19.

*Primary Examiner*—William E. Wayner

[57] ABSTRACT

A Network Management Control System for a multi-space building having individual space heating and cooling units in each space that ties the individual heating and cooling units together with a central computer which allows the remote computer to interrogate and overwrite parameters set at each local heating and cooling unit.

3 Claims, 1 Drawing Sheet

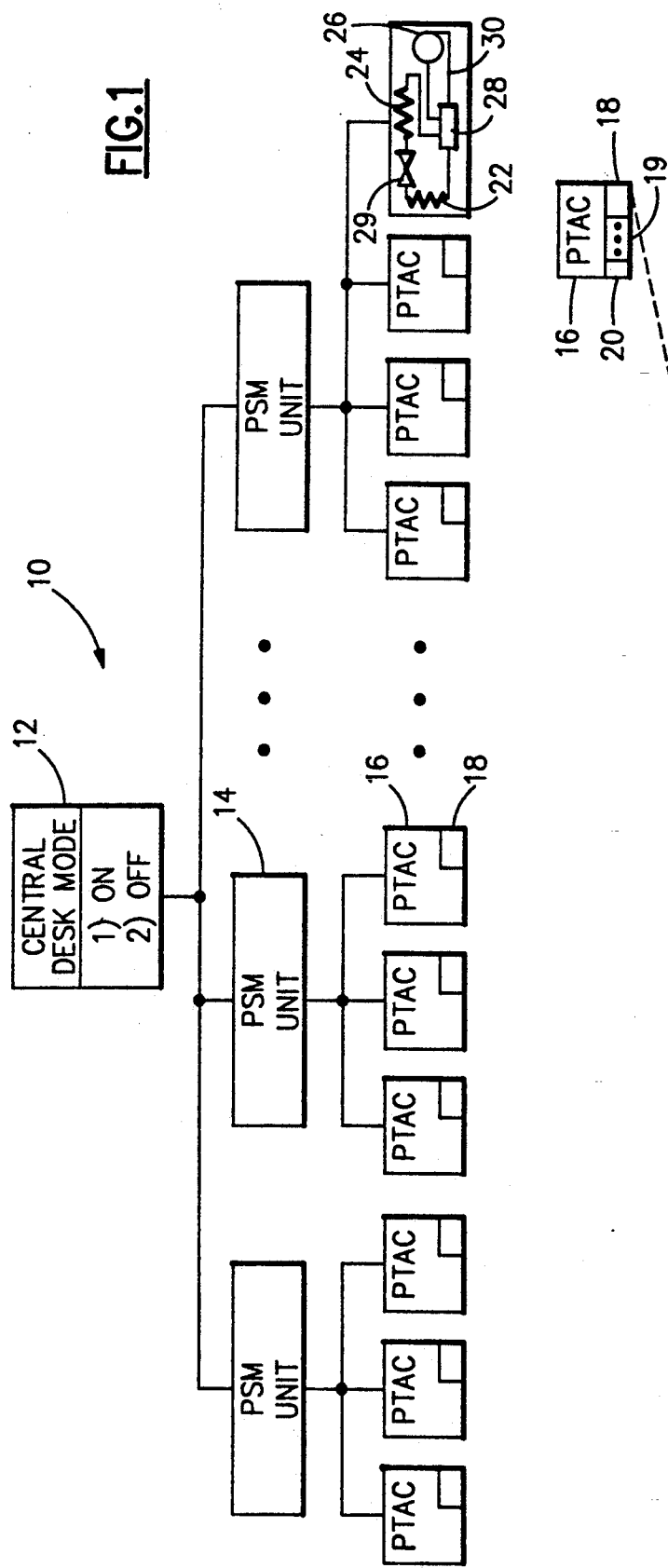

NETWORK MANAGEMENT CONTROL

BACKGROUND OF THE INVENTION

This invention relates generally to electronic controls for a heating and air conditioning system and, more particularly, to a control for a network system used in multi-space buildings, having individual space heating and cooling units.

With the increasing cost of electricity, the cost of operation of heating and cooling units has become very expensive. This problem is particularly acute for hotels and the like where there is no central management system but only direct control by occupants for controlling the electro-mechanical space conditioning units, e.g. package terminal air conditioning (PTAC) units. As often happens, either occupants of hotel rooms energize the PTAC unit when first entering the room for comfort at night, but do not change the operation of the unit when they leave the room during the day, or the hotel maintains all rooms, even unrented rooms, continuously conditioned. Such operations increase energy costs by keeping rooms conditioned even though unoccupied.

Further, hotels generally perform maintenance on PTAC's on a periodic timed basis, i.e. maintenance personnel enter each room and clean all filters on a regular basis whether needed or not. Maintenance personnel must also seasonally enter each room to reconfigure the fan mode of each room unit, i.e. fan cycle during winter months and continuous fan during summer months.

Thus, there is a clear need for a Network Management Control System that will provide hotels and the like with energy and labor savings by only conditioning rented/occupied rooms and by allowing hotel maintenance personnel to monitor PTAC units for performing maintenance only when required and by remotely configuring all space units from one central location.

SUMMARY OF THE INVENTION

An object of the present invention is to provide a network system to control and monitor each unit in a space from a central location.

It is a further object of the present invention to provide a network system for maximizing the efficiency of a building having a plurality of units at different locations on the network.

It is yet another object of the present invention to provide a network system for controlling a plurality of units for space conditioning which is cost effective to maintain.

In accordance with an aspect of the present invention, these and other objects are attained with a network control system which uses an electronic space conditioner unit or PTAC connected to a system manager unit, which in turn will interface with a building central system or a central desk computer. The network control system permits the central desk computer to interrogate and overwrite parameters in the system manager unit and thus the space conditioner unit. The network control system will lower energy cost by permitting the building owner to condition occupied space/rooms only. Wasted energy from conditioning unoccupied spaces can be lowered or eliminated due to the central desk computer having direct control over space conditioning. The electronic space conditioner unit includes a switch/keyboard device which allows an occupant to change the temperature setpoint at which the unit will operate and, to change the operating mode, i.e. fan only, ON or OFF, that the unit will operate. When the occupant selects "ON" the control shall automatically switch between heating and cooling to meet and hold the space setpoint. The central desk computer can, in addition to being able to overwrite or modify the above parameters, can initiate a unit keyboard lockout mode in which the unit keyboard can be enabled or disabled and the conditioner unit shall allow or not allow keyboard operations; can initiate an operating mode lockout in which the conditioner unit shall not operate in a disabled mode, regardless of unit keyboard selection; can initiate a fan mode change to either Cycle or Continuous; can initiate a setpoint range limit change in which the conditioner unit shall operate to the new setpoint limit values; and will automatically relax the space setpoints when an unoccupied space signal is received from a central desk computer. However, the occupant of a space may always override the central desk computer setting for the temperature setpoint and the operating mode. Other objects, features and advantages of this invention will become apparent from the ensuing description of a preferred embodiment which should be read in conjunction with the accompanying drawings.

BRIEF DESCRIPTION OF THE DRAWINGS

The accompanying drawings form a part of the specification. Throughout the drawings, like reference numbers identify like elements.

FIG. 1 is a schematic illustration of a network control system which operates according to the principles of the present invention; and FIG. 2 is a schematic illustration of a control unit for a space conditioning unit which operates according to the principles of the present invention.

DESCRIPTION OF THE PREFERRED EMBODIMENTS

Referring now to FIG. 1, the multi-space Network Control System 10 or Hotel Network System comprises a central desk computer 12, a plurality of electronically controlled individual space conditioning units 16 known as Package Terminal Air Conditioners (PTAC's) each having a keyboard 18 for human interface to the PTAC, and a plurality of conditioner or PTAC system managers (PSM) 14. As is well known, such PTAC's include an indoor heat exchange coil 22, an outdoor heat exchange coil 24, compressor 26, and refrigerant conduit means interconnecting the coils and compressor, the conduit means including a reversing valve 28, an expansion means 29, and appropriate interconnecting piping 30. As is well known, such PTAC's function whenever a space thermostat is calling for heating or cooling to cause the compressor 26 to operate. If heating is being demanded, then the compressed hot refrigerant from the compressor 26 will be routed through the reversing valve 28 then through the indoor heat exchanger coil 22 where its heat is given up to heat the space or room by air circulated through coil 22 by an indoor fan delivering warm air to the conditioned space or room then through the outdoor coil 24 and back to the compressor. Conversely, if cooling of the space is being demanded, then the hot refrigerant from the compressor 26 is routed through the reversing valve 28 to the outdoor heat exchanger coil 24 where the refrigerant is cooled for subsequent use indoors in the indoor coil to cool the conditioned space or room.

The present invention is concerned with a local area network that ties PTAC units together with a Building management System, and more specifically with a Hotel Network System that allows a central desk computer to interrogate and overwrite parameters in the PTAC unit. The PSM unit 14 is a slave to the central desk computer 12 but is the master to the PTAC unit 16. The PSM unit 14 interrogates and overwrites parameters in the PTAC unit 16 and also performs basic system applications. The purpose of the Hotel Network System is to lower energy costs by allowing the hotel to condition only rented rooms, and to lower labor cost by allowing the hotel maintenance personnel to monitor all PTAC units from a central location and to remotely configure each PTAC unit.

The Central Desk Computer 12 may contain a Hotel Management System which performs billing and reservations, as is well known, can range from a personal computer to a large main frame computer.

Turning now to FIG. 2, there is illustrated a detailed keyboard 18 of the PTAC 16. The keyboard which maybe a membrane type, allows the occupant of the space to select various operating modes and temperature setpoints. The keyboard may include plurality of the LED's 19 to provide visual feedback to the occupant. The LED display generally indicates the user operation mode which indicates that only the fan is operating or that the unit is "OFF", or that the unit is in "AUTO". In the "AUTO" mode the PTAC shall operate in either heat or cool, depending on the setpoint of the unit. Such a setpoint is selected by the operator by either a setpoint UP arrow or a setpoint DOWN arrow in conjunction with a plurality of LED. Each LED will represent a setpoint temperature, generally from 64° F. to 84° F. in specific increments. Unit switches allow the maintenance staff to set the fan mode in either "CYCLE" or "CONTINUOUS." operation. In continuous mode the indoor fan operates all the time, while in cycle mode the indoor fan operates in conjunction with the compressor. The PTAC unit may include a sensor 20, such as a well known motion sensor, which when the PTAC unit receives an unoccupied room signal, it automatically switches into an unoccupied mode whereby the space setpoints are slowly relaxed over a set period of time until the PTAC unit cycles off.

The keyboard and LED allow user operation and monitoring of fan speed in OFF, LOW, MEDIUM or HIGH, and also allow for the operating mode to be set in either HEAT or COOL. Diagnostic information is also displayed as Filter Warning, System Failure and System Alarm. Further the units may be configured in a Mode Lockout, fan cycle/continuous or Setpoint Range Limiting.

While the invention has been described in detail with reference to the illustrative embodiments, some modifications and variations would present themselves to those skilled in the art.

What is claimed is:

1. A system for controlling the operation of a plurality of packaged terminal air conditioning units each having individual keyboards, each individual keyboard having an operative switch selection for changing the temperature setpoint at which the packaged terminal unit will operate and an operative switch selection for changing the operating mode, said system further comprising:

a plurality of packaged air conditioner unit system managers for interrogating and overwriting parameters in a subgrouping of packaged air conditioner units;

a central desk computer for controlling the interrogation and overwriting of parameters by said unit system managers, said central desk computer including a means for overwriting or modifying the operative switch selections on the individual keyboards, and each packaged terminal air conditioning unit including means, associated with the operative switch selection on the keyboard for changing the temperature setpoint, for overriding the temperature setpoint that may have been established by said overwriting means in said central desk computer.

2. The system of claim 1 wherein each packaged terminal air conditioning unit furthermore includes means, associated with the operative switch selection on the keyboard for changing the operating mode, for overriding the operating mode selection established by said central desk computer.

3. The system of claim 2 wherein each packaged terminal air conditioning unit furthermore includes:

a motion detection device; and means responsive to the motion detection device for setting a packaged terminal air conditioning unit to an unoccupied mode of operation whereby the setpoints currently established by keyboard switch selection are slowly relaxed over a set period of time.

* * * * *